(No Model.)

F. H. C. MEY.
ELEVATOR BOOT.

No. 391,061. Patented Oct. 16, 1888.

Witnesses:
Geo. J. Buchheit Jr.
Theo. L. Popp

F. H. C. Mey, Inventor.
By Wilhelm & Bonner
Attorneys.

UNITED STATES PATENT OFFICE.

FREDERICK H. C. MEY, OF BUFFALO, NEW YORK.

ELEVATOR-BOOT.

SPECIFICATION forming part of Letters Patent No. 391,061, dated October 16, 1888.

Application filed February 21, 1888. Serial No. 264,715. (No model.)

*To all whom it may concern:*

Be it known that I, FREDERICK H. C. MEY, of the city of Buffalo, in the county of Erie and State of New York, have invented a new and useful Improvement in Elevator-Boots, of which the following is a specification.

This invention relates to an improvement in the adjustable bearings in which are journaled the pulleys around which the elevator belt or chain passes.

The object of my invention is to construct these bearings in such a manner that they can be adjusted longitudinally for tightening the belt, as well as laterally or angularly, so that the bearings can be adjusted in line with the elevator-legs, whether the same be arranged at an angle or perpendicularly to the boot, thereby causing the belt to run properly at all times, and preventing the same from coming in contact with the inner sides of the elevator-legs.

The invention consists of the improvements which will be hereinafter fully described, and pointed out in the claims.

Figure 1:
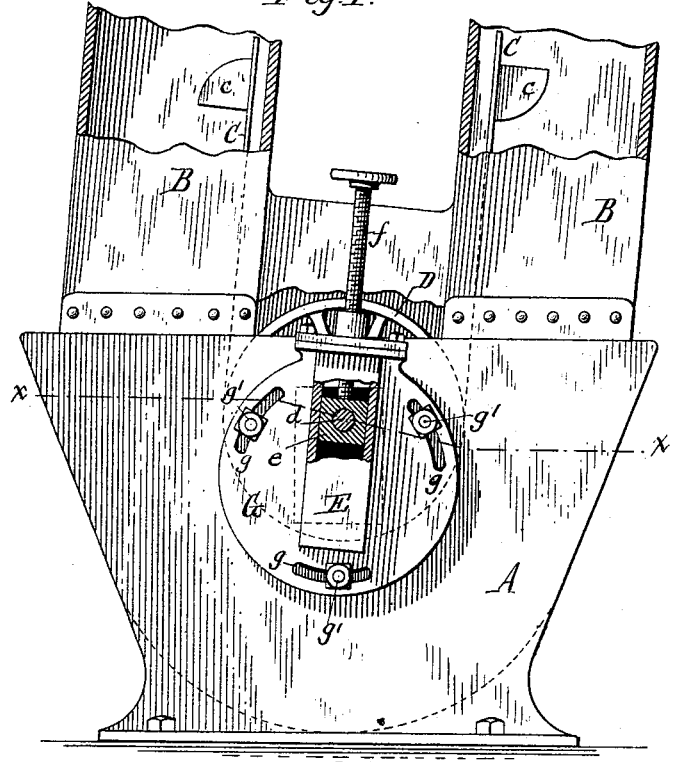
Figure 2:
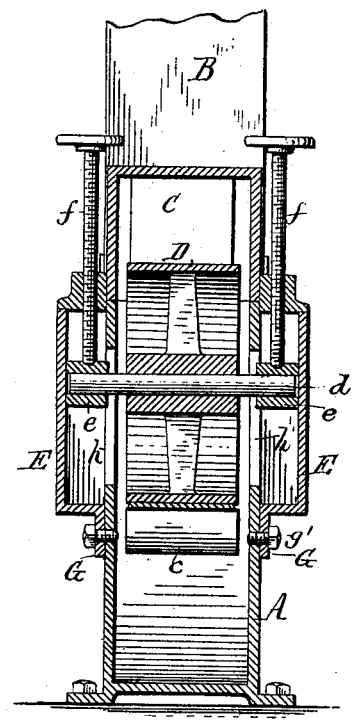
Figure 3:
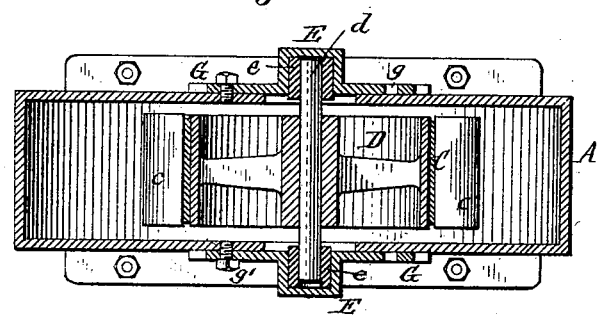
Figure 4:
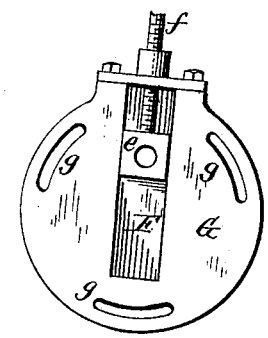

In the accompanying drawings, Figure 1 is a side elevation of an elevator-boot provided with my improved bearings, the latter being partly in section. Fig. 2 is a vertical cross-section thereof. Fig. 3 is a horizontal section in line $x$ $x$, Fig. 1. Fig. 4 is an inside view of one of the bearing-boxes and bearing.

Like letters of reference refer to like parts in the several figures.

A represents the boot, which may be of any ordinary construction; and B B are the elevator-legs, secured with their lower ends to the boot A in the usual manner.

C represents the elevator belt or chain, to which the buckets $c$ are attached, and D is the pulley around which the lower portion of the belt C runs. The upper portion of the belt runs around a suitable pulley mounted in stationary bearings and is not shown in the drawings.

$d$ is the horizontal shaft of the pulley D, which is journaled at both ends in vertically-movable bearings $e$ $e$, arranged in rectangular bearing-boxes E E, adjustably secured to opposite sides of the boot A. These bearing-boxes form recessed ways, in which the bearings move in tightening the lower pulley.

$f$ $f$ represent adjusting-screws working in threaded openings formed in the upper ends of the bearing-boxes E E and bearing with their lower ends upon the bearings $e$ $e$, so that by turning the screws in the proper direction the bearings are depressed in the bearing-boxes and the belt C is tightened. The adjusting-screws $f$ $f$ are provided with suitable hand-wheels for turning the same, as shown.

The bearing-boxes E E are each provided with a circular plate or disk, G, resting against the side of the boot and having curved slots $g$, through which pass horizontal fastening-bolts $g'$. These slots are curved concentric with the center of the disks G, so that upon loosening the bolts $g'$ the disks, with the bearing-boxes E, can be turned on the bolts in either direction, as on a pivot, to adjust the angle or inclination of the bearing-boxes to that of the elevator-legs B B. When the boxes are adjusted, the bolts $g'$ are again tightened. This construction enables the bearing-boxes to be adjusted so that the ways in which the bearings move stand parallel with the belt, and since the adjusting-screws are attached to these boxes the position of the screws is at the same time adjusted so that they exert their pressure in lines parallel with the belt, whereby the pressure is properly applied in tightening the belt without cramping the bearings in their ways. After the boxes have been adjusted to conform to the position of the elevator-legs, so that the belt clears the same, the lower pulley can be tightened by the screws.

The boot A is provided in opposite sides with upright slots $h$, which receive the inner ends of the bearings $e$ $e$, as represented in Figs. 2 and 3. These slots are made wider than the bearings $e$ $e$, to give the latter the necessary play in the various adjustments of the bearing-boxes.

I claim as my invention—

1. The combination, with an elevator-boot and its pulley, of bearings in which the pulley is journaled, bearing-boxes containing ways in which the bearings move in tightening the pulley, said boxes being adjustably secured to the sides of the boot, whereby the position of the ways can be adjusted to conform to the position of the elevator-legs, and adjusting-screws engaging with the bearings and threaded in the adjustable bearing-boxes, substantially as set forth.

2. The combination, with the boot A, of bearing-boxes E E, arranged on opposite sides of the boot A and provided with plates G, having slots $g$, fastening-bolts $g'$, passing through said slots, and bearings $e\ e$, arranged in said bearing-boxes, substantially as set forth.

3. The combination, with the boot A, of bearing-boxes E E, arranged on opposite sides of said boot and provided with plates G, having curved slots $g$, fastening-bolts $g'$, passing through said slots, movable bearings $e\ e$, arranged in said bearing-boxes, and adjusting-screws $f\ f$, substantially as set forth.

Witness my hand this 8th day of February, 1888.

FREDERICK H. C. MEY.

Witnesses:
FRED. C. GEYER,
CHESTER D. HOWE.